(12) United States Patent
Morimoto

(10) Patent No.: US 8,711,246 B2
(45) Date of Patent: Apr. 29, 2014

(54) SINGLE-LENS REFLEX DIGITAL CAMERA WHICH DISPLAYS AN IMAGE FOR LIVE VIEW

(75) Inventor: Kazuya Morimoto, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 471 days.

(21) Appl. No.: 12/408,846

(22) Filed: Mar. 23, 2009

(65) Prior Publication Data

US 2009/0256932 A1    Oct. 15, 2009

(30) Foreign Application Priority Data

Apr. 15, 2008  (JP) ................................. 2008-105299

(51) Int. Cl.
  *H04N 5/76*   (2006.01)
  *H04N 5/222*  (2006.01)
  *H04N 5/225*  (2006.01)
(52) U.S. Cl.
  USPC .................... 348/231.9; 348/333.01; 348/374
(58) Field of Classification Search
  None
  See application file for complete search history.

(56) References Cited

U.S. PATENT DOCUMENTS

| | | | |
|---|---|---|---|
| 6,944,358 B2 * | 9/2005 | Morimoto et al. | 382/304 |
| 7,576,782 B2 * | 8/2009 | Nakasuji et al. | 348/222.1 |
| 2003/0193699 A1 * | 10/2003 | Tay | 358/474 |
| 2006/0140498 A1 * | 6/2006 | Kudo et al. | 382/254 |
| 2007/0188629 A1 * | 8/2007 | Nakabe et al. | 348/231.3 |
| 2009/0073300 A1 * | 3/2009 | Chung | 348/333.01 |

FOREIGN PATENT DOCUMENTS

| | | |
|---|---|---|
| JP | 2000-175100 | 6/2000 |
| JP | 2003-244529 | 8/2003 |
| JP | 2005-64782 | 3/2005 |
| JP | 2006-33241 | 2/2006 |
| JP | 2006-93838 | 4/2006 |
| JP | 2007-221268 | 8/2007 |
| JP | 2007-243561 | 9/2007 |
| JP | 2007-288245 | 11/2007 |

* cited by examiner

*Primary Examiner* — Justin P Misleh
(74) *Attorney, Agent, or Firm* — Oblon, Spivak, McClelland, Maier & Neustadt, L.L.P.

(57) ABSTRACT

The single-lens reflex digital camera includes a CCD for imaging an image for storage and a CCD for imaging an image for live view. A pixel signal output from the CCD is processed in an image preprocessing unit, an image general processing unit, and a JPEG processing unit and stored in a memory card as JPEG data. A pixel signal output from the CCD is processed in a live image processing unit and stored in the memory card as YUV data for display. A display control unit reads the YUV data for display from the main memory and outputs the data to a LCD. The CPU adjusts frame rate of the live view image depending on the usage rate of the band of a main bus.

12 Claims, 6 Drawing Sheets

SINGLE-LENS REFLEX DIGITAL CAMERA WHICH DISPLAYS AN IMAGE FOR LIVE VIEW

BACKGROUND OF THE INVENTION

1. Field of the Invention

The present invention relates to a single-lens reflex digital camera capable of displaying live view.

2. Description of the Background Art

There is a type of single-lens reflex digital camera capable of displaying live view on a liquid crystal display monitor. A photographer looks for the right time to take an image while seeing a real-time image displayed on the liquid crystal display monitor. In recent years, the size of the liquid crystal display monitor is increased so that operability of the single-lens reflex digital camera having a live view display function is improved.

In the single-lens reflex digital camera, ingenious attempts have to be made to realize live view display. On the other hand, in a compact digital camera, a light from a subject is always incident on an imaging element for imaging an image for storage so that an output from the imaging element can be utilized for live view display.

In the single-lens reflex digital camera, however, the light from the subject is reflected by a movable mirror (reflex mirror) and guided to a finder before imaging operation. Therefore, the light from the subject is not incident on the imaging element for imaging the image for storage before imaging operation.

There is a single-lens reflex digital camera separately including the imaging element for imaging the image for storage and the imaging element for imaging the image for live view. FIG. 6 is a block diagram showing a conventional type of single-lens reflex digital camera 100 including two imaging elements.

The single-lens reflex digital camera 100 includes two CCDs 101 and 102. The CCD 101 is the imaging element for imaging the image for storage, and the CCD 102 is the imaging element for imaging the image for live view. The single-lens reflex digital camera 100 also includes a LSI 110, a memory card 117, a LCD 118, and a main memory 120.

The LSI 110 includes a selector 111, an image preprocessing unit 112, an image general processing unit 113, a display control unit 114, a JPEG processing unit 115, and a card controller 116.

The selector 111 inputs pixel signals output from the CCDs 101 and 102 and outputs the input pixel signals from either the CCD 101 or the CCD 102 to the image preprocessing unit 112.

A process executed when the image preprocessing unit 112 inputs pixel signals output from the CCD 101 will be described. That is to say, a series of process steps for the image for storage will be described. The image preprocessing unit 112 executes processings of correction of defective pixel, black level difference operation, or the like, to generate RAW image data 131. The image preprocessing unit 112 stores the generated RAW image data 131 in the main memory 120.

The image general processing unit 113 reads the RAW image data 131 stored in the main memory 120 and executes image processings of pixel interpolation process, gamma conversion process, color space conversion process, or the like, to generate YUV data for storage 133. The image general processing unit 113 stores the generated YUV data for storage 133 in the main memory 120.

The JPEG processing unit 115 reads the YUV data for storage 133 stored in the main memory 120 and executes JPEG compression coding to generate JPEG data 134. The JPEG processing unit 115 stores the generated JPEG data 134 in the main memory 120.

The card controller 116 reads the JPEG data 134 stored in the main memory 120 and writes into the memory card 117. By executing such a series of process steps, the JPEG data 134 is written into the memory card 117 as the imaged image data for storage.

Next, a process executed when the image preprocessing unit 112 inputs pixel signals output from the CCD 102 will be described. That is to say, a series of process steps for the image for live view will be described.

The image preprocessing unit 112 executes processings of pixel interpolation process, gamma conversion process, color space conversion process, or the like as well as processings of correction of defective pixel, black level difference operation, or the like, to generate YUV data for display 132. The image preprocessing unit 112 stores the generated YUV data for display 132 in the main memory 120. Thus, the image preprocessing unit 112 includes process blocks for executing processings of pixel interpolation process, gamma conversion process, color space conversion process, or the like, in order to generate YUV data for display 132. Process blocks including relatively simple functions compared to those included in the image general processing unit 113 are provided as these process blocks.

The display control unit 114 reads the YUV data for display 132 stored in the main memory 120 and outputs the data to the LCD 118.

Inclusion of the two CCDs 101 and 102 as described makes recording of the imaged image data for storing in the memory card 117 and display of live view image on the LCD 118 possible. However, the pixel signal output from the CCD 102 cannot be read into the image preprocessing unit 112 while the image preprocessing unit 112 reads the pixel signal from the CCD 101 and the image preprocessing unit 112 executes image processings onto the pixel signal output from the CCD 101. Therefore, live view display is stopped until transfer and image processings of the pixel signal for storage are completed. The mechanism of this operation will be described with reference to FIG. 7.

FIG. 7 is a diagram showing a process sequence when the single-lens reflex digital camera 100 executes continuous imaging process (hereinafter, the continuous imaging process is appropriately referred to as continuous shooting). A signal B1 represents a signal controlling opening and closing operations of the movable mirror. "Open" in FIG. 7 indicates a state where the movable mirror is raised up, that is to say, a timing at which the light from the subject is incident on the CCD 101. "Close" in FIG. 7 indicates a state where the movable mirror is closed, that is to say, a period during which the light from the subject is incident on the CCD 102. A signal B2 represents a vertical synchronizing signal (VD) of the CCD 101.

A timing flow B3 represents a timing at which the CCD 101 exposes a still image (image for storage) to light. A timing flow B4 represents a timing at which the image preprocessing unit 112 reads the pixel signal from the CCD 101 and a timing at which image processings are executed in the image preprocessing unit 112. A timing flow B5 represents a timing at which the image general processing unit 113 executes image processings on the RAW image data 131 and a timing at which the JPEG processing unit 115 executes JPEG compression process on the YUV data for storage 133. A timing flow B6 represents a timing at which the card controller 116 stores the JPEG data 134 in the memory card 117. Then, a timing flow B7 represents a timing at which the image for live view output from the CCD 102 is displayed in the LCD 118. At the timing flow B7, "On" indicates a timing at which live view is displayed and "Stop" indicates a timing at which live view display is stopped.

It is to be noted that "1st", "2nd", and "3rd" in FIG. 7 indicate processes for first, second, and third still images, respectively, during continuous shooting.

Live view is displayed before first "Open" operation of the movable mirror as shown in FIG. 7. Along with the first "Open" operation of the movable mirror, the CCD 101 exposes a first still image to light. During this period, live view display is stopped because the light from the subject is not incident on the CCD 102.

Then, along with first "Close" operation of the movable mirror, the image preprocessing unit 112 reads the first still image from the CCD 101 and image processings are started in the image preprocessing unit 112. However, live view display is stopped since the pixel signal from the CCD 101 is continuously output in this period. Namely, the image preprocessing unit 112 is used for the processings of the still image for storage.

The image preprocessing unit 112 reads the image for live view from the CCD 102 and executes image processings from the time when reading process and image processings of the first still image in the image preprocessing unit 112 are completed. Then, the YUV data for display 132 which is stored in the main memory 120 by the image preprocessing unit 112 is read by the display control unit 114 and live view is started to be displayed.

Subsequently, when second "Open" operation of the movable mirror is started, live view display is stopped because the light from the subject is not incident on the CCD 102. In imaging of the second still image, live view display is stopped while the image preprocessing unit 112 reads the still image from the CCD 101 and executes image processings as in imaging of the first still image.

Thus, in the conventional single-lens reflex digital camera 100, live view display is stopped while the still image is continuously read since the image preprocessing unit 112 which operates as a sensor interface and an image processing unit switches to read images from two image sensors. During continuous shooting, therefore, a period of displaying live view is very short, and there has been a demand to improve operability during continuous shooting.

An invention disclosed in Japanese Patent Publication Laid Open Gazette No. 2007-243561 relates to a digital camera including the imaging element for the image for storage and the imaging element for the image for live view. This digital camera is designed to switch signals output from the two imaging elements by a selector and input the selected signal to control means for executing image processings. Therefore, live view cannot be displayed while image processings are being executed on a still image.

In some single-lens reflex digital cameras, imaging of the image for storage and imaging of the image for live view are realized using single imaging element. However, when the image for storage is started to be imaged, live view display is completely stopped until the transfer of the image data from the imaging element is completed. This leads to the fact that it takes long time to restore live view display after the imaging operation is executed.

SUMMARY OF THE INVENTION

The present invention is directed to a single-lens reflex digital camera which displays an image for live view on a display device. The single-lens reflex digital camera according to the invention includes a first imaging element for imaging an image for storage, a second imaging element for imaging an image for live view, a first image processing unit which executes image processings on a pixel signal output from the first imaging element, a second image processing unit which executes image processings on a pixel signal output from the second imaging element, an image compressing unit which compresses the image data for storage on which image processings have been executed in the first image processing unit and generates compressed image data, and a display control unit which outputs the image data for live view on which image processings have been executed in the second image processing unit to the display device.

The image for live view can be concurrently processed in the second image processing unit while the first image processing unit reads the image for storage from the imaging element and executes image processings, and live view display can be restored at an early timing after the image for storage is imaged.

According to another aspect of the invention, the single-lens reflex digital camera further includes a rate adjusting unit which adjusts frame rate of the image for live view.

Even when image processings of the image for storage and the image processings of the image for live view are concurrently executed, a bus band is not squeezed. This makes live view possible to be displayed without delaying processings of the image for storage.

An object of the present invention is, therefore, to provide a single-lens reflex digital camera capable of displaying live view image for a long period of time during continuous shooting.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
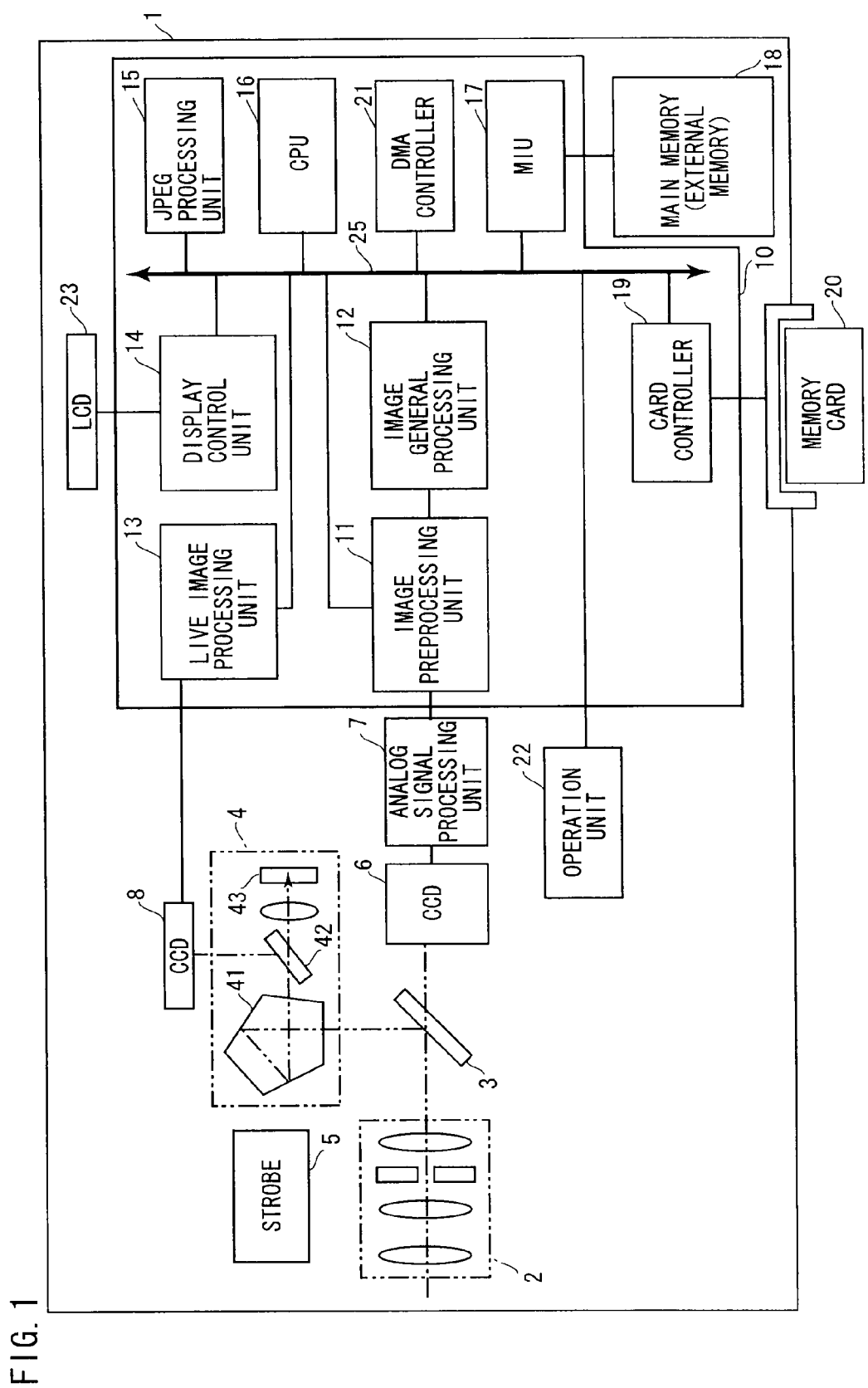
FIG. 1 is a block diagram showing functions of a single-lens reflex digital camera according to an embodiment of the present invention.

Hereinafter, an embodiment according to the present invention will be described with reference to the drawings. FIG. 1 is a block diagram showing functions of a single-lens reflex digital camera 1 according to an embodiment. The single-lens reflex digital camera 1 includes an optical mechanism 2 having an auto focus (AF) function, an automatic diaphragm control function, and the like. A light from a subject which is incident through the optical mechanism 2 is reflected by a movable mirror 3 (reflex mirror) and guided to a finder portion 4.

The finder portion 4 includes a pentaprism 41, a half mirror 42, and a viewfinder 43, and the light reflected by the movable mirror 3 is reflected by the pentaprism 41 and transferred to the viewfinder 43 as an erected image. A user can optically confirm the subject image in an imaging range by looking through the viewfinder 43.

The movable mirror 3 is configured to be rotatable with a mirror driving mechanism (not shown). When the user presses a shutter button and the imaging operation is executed, the movable mirror 3 is raised up and the light from the subject which is incident through the optical mechanism 2 is taken in a CCD 6 through the shutter. At this time, light of which quantity is adjusted in synchronization with the imaging timing may be emitted from a strobe 5 to irradiate the subject if needed.

The CCD 6 is an imaging sensor which photoelectrically converts the incident light and outputs accumulated electric charge as an electrical signal. It is to be noted that a CMOS sensor may be used as the imaging sensor.

Figure 2:
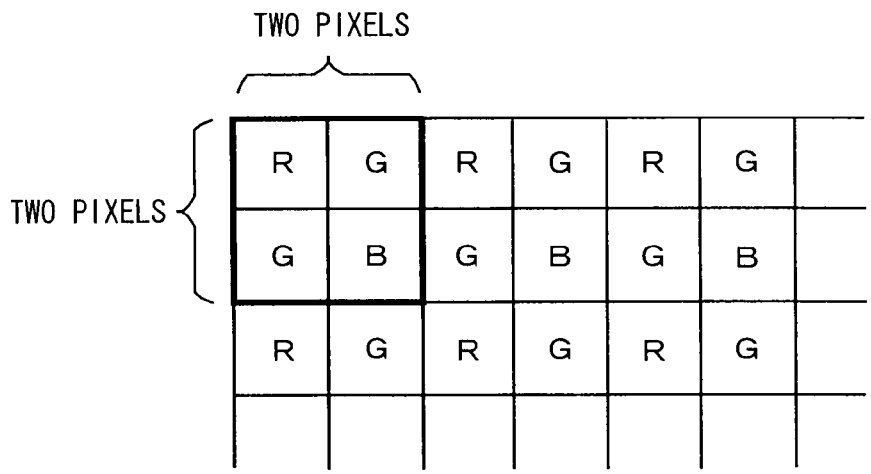
FIG. 2 is a view showing a RGB bayer array.

Further, the color filter array of the RGB bayer array as shown in FIG. 2 is provided in the CCD 6. The pixel signal output from the CCD 6 is, therefore, the pixel signal having one color component out of R, G and B on each pixel.

The light from the subject, which is reflected by the half mirror 42 of the finder portion 4 described above, is incident on a CCD 8 for live view. As in the CCD 6, the color filter array of the RGB bayer array is provided in the CCD 8 so that the pixel signal of the bayer array is output from the CCD 8.

An analog pixel signal output from the CCD 6 is input to an analog signal processing unit 7, subjected to analog signal processing, and then A/D-converted.

The digital pixel signal after being A/D-converted is input to the image preprocessing unit 11. The image preprocessing unit 11 executes processings of correction of defective pixel, black level difference operation, or the like onto the input digital pixel signal. Also, the image preprocessing unit 11 executes processing of obtaining an evaluation value from the input digital pixel signal for exposure control and white balance adjustment.

The digital pixel signal output from the image preprocessing unit 11 is the RAW image data which is not subjected to pixel interpolation process. As described above, the digital pixel signal output from the image preprocessing unit 11 is a signal having only one color component out of R, G and B on each pixel since the CCD 6 includes the color filter array of the RGB bayer array. The image preprocessing unit 11 is connected to a main bus 25 and the RAW image data after being subjected to image preprocessings can be stored in a main memory 18 as it is.

The image preprocessing unit 11 is also connected to an image general processing unit 12, and can output the RAW image data directly to the image general processing unit 12 without outputting the data to the main bus 25. The image general processing unit 12 executes general image processings including pixel interpolation process onto the RAW image data.

Figure 3:
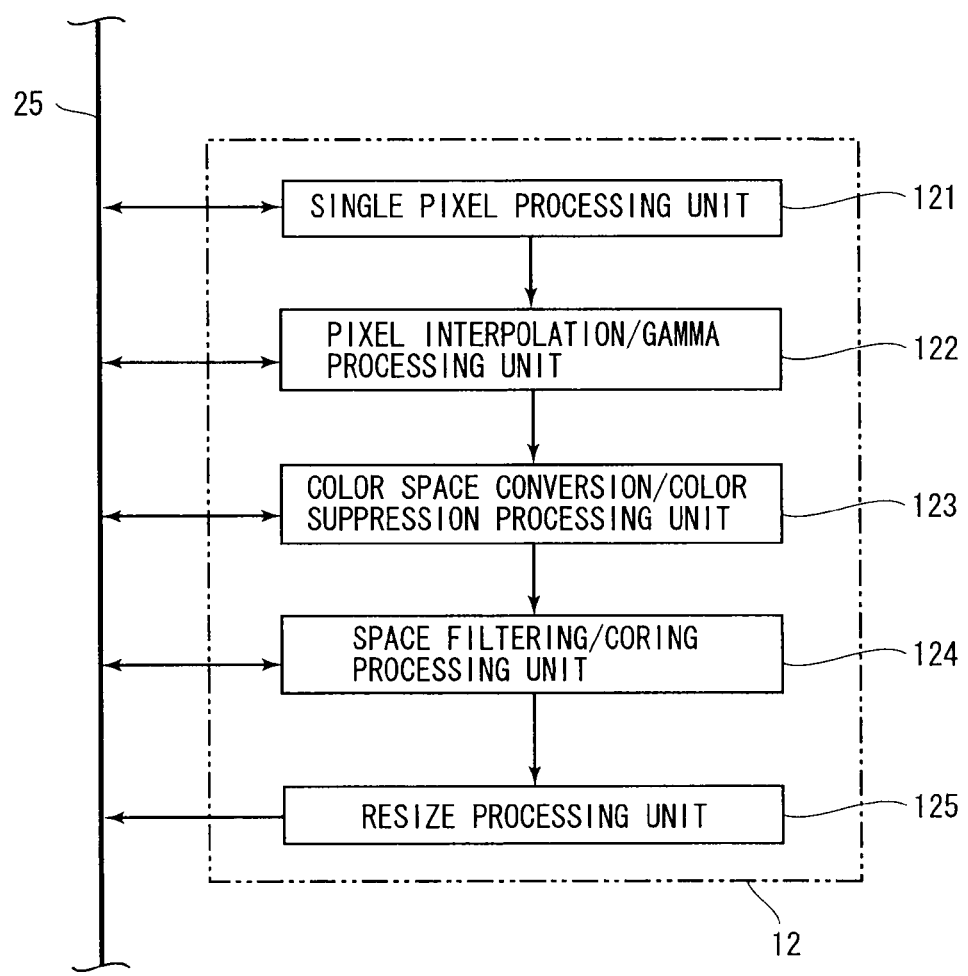
FIG. 3 is a block diagram showing functions of an image general processing unit.

FIG. 3 is a block diagram showing process steps of the image general processing unit 12. The image general processing unit 12 includes a single pixel processing unit 121, a pixel interpolation/gamma processing unit 122, a color space conversion/color suppression processing unit 123, a space filtering/coring processing unit 124, a resize processing unit 125.

The single pixel processing unit 121 executes time lapse averaging process by which pixel values of the input image data are averaged for a plurality of frames, for example, and shading correction process by which unevenness of tone in the image is corrected. Further, the single pixel processing unit 121 controls the gain of the digital image to control exposure of the imaged image to the light. Moreover, the single pixel processing unit 121 adjusts white balance of each pixel of the digital image.

The pixel interpolation/gamma processing unit 122 includes a pixel interpolation processing unit which interpolates the input image data with insufficient color components for each pixel by reference to surrounding pixels and a gamma correction processing unit which corrects gamma characteristic of the image. The pixel interpolation processing unit executes pixel interpolation so that the input image data is converted to image data having all color components of R, G and B on each pixel.

The color space conversion/color suppression processing unit 123 includes a color space conversion processing unit which converts a RGB color space of the input image data to a YCbCr color space, for example, and a color suppression processing unit which suppresses coloration in the bright and dark portions in the image of which white balance is easily deviated. In this embodiment, image data in the RGB color space is converted to YUV image data in the color space conversion processing unit.

The space filtering/coring processing unit 124 includes a space filtering unit which emphasizes lines or edges in the image, removes noise, or the like for the input image data and a nonlinear processing unit which mainly suppresses high frequency component of the pixel signal.

The resize processing unit 125 adjusts a resolution of the input image data in response to the size of the stored image set by the user.

The image general processing unit 12 includes a plurality of process blocks 121 to 125, as described above. Then the image general processing unit 12 can generate the YUV image data by reading the RAW image data stored in the main memory 18 and processing the data in process blocks 121 to 125 in this order.

Alternatively, the image general processing unit 12 can process the RAW image data directly input from the image preprocessing unit 11. Therefore, the image data output from the CCD 6 can be directly processed in real time as it is without storing the data in the main memory 18 as the RAW image data. In such a manner, the image general processing unit 12 includes a plurality of line memories in order to process the RAW image data input from the image preprocessing unit 11 in real time without storing the data in the main memory 18.

Process blocks 121 to 125 included in the image general processing unit 12 are also separately connected to the main bus 25. Therefore, the image general processing unit 12 can sequentially process the RAW image data input from the image preprocessing unit 11 in real time and process blocks 121 to 125 can read and process the image data separately stored in the main memory 18.

The YUV image data output from the image general processing unit 12 is stored in the main memory 18 and then subjected to JPEG compression process in a JPEG processing unit 15. The JPEG data is stored in the main memory 18.

JPEG data stored in the main memory 18 is stored in a memory card 20 such as a flush memory through a card controller 19. In such a manner, image processings are completed and the compressed storing image is stored in the memory card 20.

The single-lens reflex digital camera 1 according to the embodiment includes the CCD 8 exclusively for live view display. The light from the subject which is reflected by the half mirror 42 is incident on the CCD 8, as described above. The pixel signal output from the CCD 8 is digital-converted in the A/D conversion circuit (not shown) and then input to a live image processing unit 13.

The live image processing unit 13 executes image preprocessings such as correction of defective pixel, and black level difference operation and general image processings such as pixel interpolation process, gamma conversion process, and color space conversion process. Specifically, the live image processing unit 13 executes interpolation process on the pixel signal of the bayer array, which is output from the CCD 8, and generates the pixel signal having all color components of R, G, and B on each pixel. Further, the live image processing unit 13 executes gamma conversion process and converts the pixel signal depending on the gamma characteristic of the LCD 23. Moreover, the live image processing unit 13 converts the pixel signal of the RGB space to the pixel signal of the YUV space. It is to be noted that the live image processing unit 13 may include, as blocks executing general image processings, blocks including simple functions compared to those in the image general processing unit 12.

The YUV image data generated in the live image processing unit 13 is stored in the main memory 18. The display control unit 14 reads the YUV image data for display, which is stored in the main memory 18, and outputs the data to the LCD 23.

In such a manner, the single-lens reflex digital camera 1 according to the embodiment includes the image preprocessing unit 11 and the image general processing unit 12 for executing image processings on the image for storage, and separately includes the live image processing unit 13 for executing image processings on the image for live view display images. Moreover, these image processing units are independently operable. This results in that the single-lens reflex digital camera 1 according to the embodiment can make the period of live view display on the LCD 23 longer during continuous shooting, as will be described in detail later.

The single-lens reflex digital camera 1 according to the embodiment is configured as described above, and hardware circuits such as the image preprocessing unit 11, the image general processing unit 12, the live image processing unit 13, the display control unit 14, the JPEG processing unit 15, and a CPU 16 are connected to the main bus 25. Further, the main memory 18 is connected to the main bus 25 through a MIU (Memory Interface Unit) 17. Moreover, the card controller 19 is connected to the main bus 25 and the memory card 20 can be accessible through the card controller 19.

A DMA controller 21 is connected to the main bus 25. The DMA controller 21 includes DMA channels which transfer data between process blocks and an arbitration circuit which arbitrates transfer order of each DMA channel. Thereby, the image preprocessing unit 11, the image general processing unit 12, the live image processing unit 13, the display control unit 14, the JPEG processing unit 15, the card controller 19, and the like, which are connected to the main bus 25, can write data into or read data from the main memory 18 under control by the DMA controller 21 without placing a process burden on the CPU 16. The CPU 16 can determine the usage rate of the band of the main bus 25 by monitoring the operation of the DMA controller 21. Alternatively, the CPU 16 can determine the usage rate of the band of the main bus 25 from the execution state of itself.

A operation unit 22 is connected to the main bus 25 and the operating instruction made by the user is notified to the CPU 16. The operation unit 22 includes all operation members for giving the single-lens reflex digital camera 1 operating instruction, such as a dial switching photographing modes and a shutter button (release button).

In the single-lens reflex digital camera 1 configured as described above, a process sequence when continuous shooting is executed will be described with reference to FIG. 4 and FIG. 5.

Figure 4:
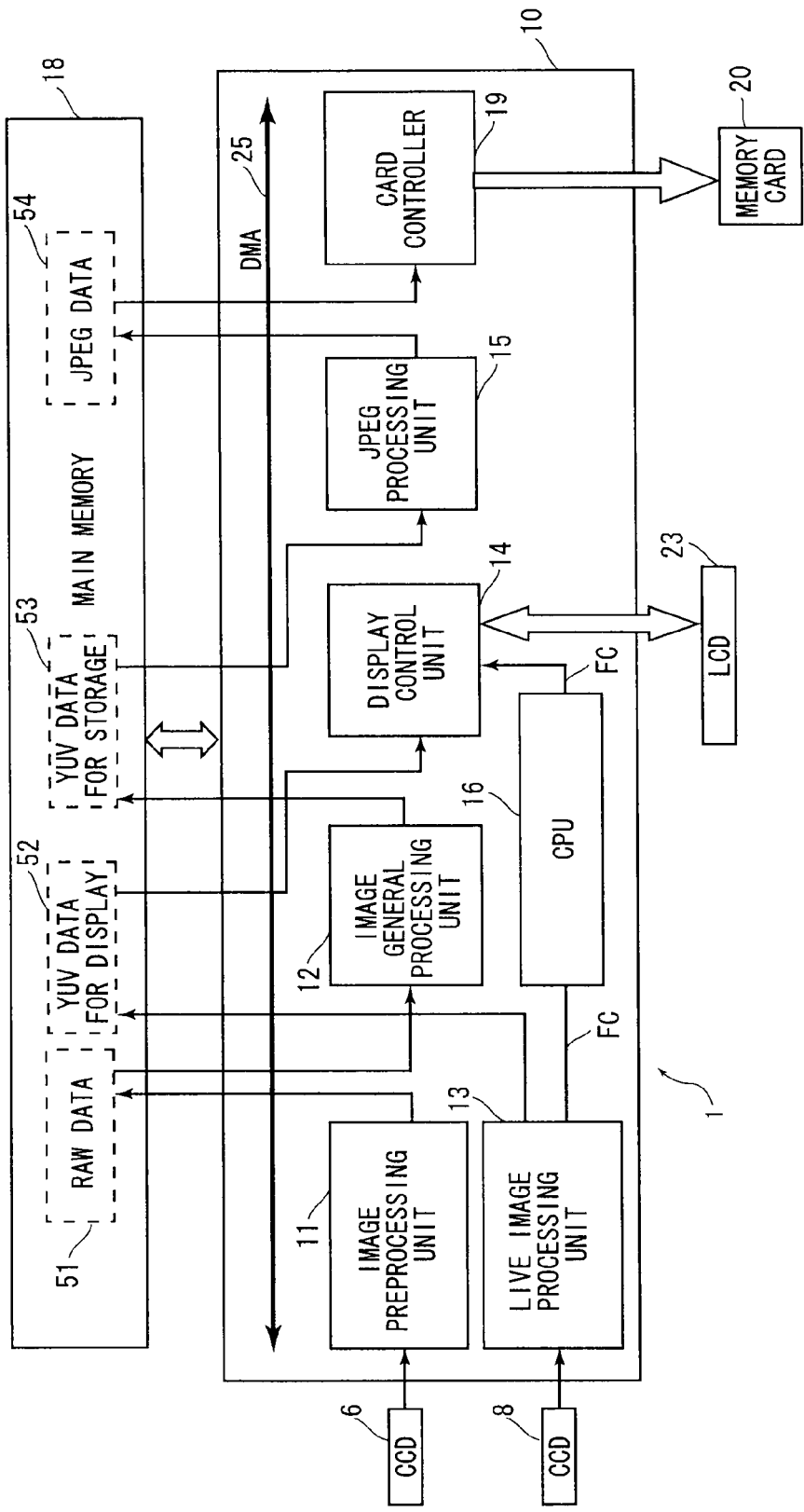
FIG. 4 is a diagram showing a flow of image processings and data stored in a main memory in the single-lens reflex digital camera according to the embodiment.

As shown in FIG. 4, the image preprocessing unit 11 stores RAW image data 51 in the main memory 18 after executing image processings on the pixel signal input from the CCD 6. After the image general processing unit 12 reads the RAW image data 51 from the main memory 18 and executes image processings, YUV data for storage 53 is stored in the main memory 18. After the JPEG processing unit 15 reads the YUV data for storage 53 from the main memory 18 and executes the JPEG compression process, JPEG data 54 is stored in the main memory 18. The card controller 19 reads the JPEG data 54 from the main memory 18 and stores the data in the memory card 20.

Thus, until the image imaged by the CCD 6 is stored in the memory card 20, writing and reading of the RAW image data 51 into and from, writing and reading of the YUV data for storage 53 into and from, and writing and reading of the JPEG data 54 into and from the main memory 18 are executed. The band of the main bus 25 is always used by these transfer processes. As described above, the RAW image data for storage 51 can be transferred from the image preprocessing unit 11 to the image general processing unit 12 without storing the RAW image data in the main memory 18. Even in this case, writing and reading of the YUV data for storage 53, and writing and reading of the JPEG data 54 are also executed.

The live image processing unit 13 stores the YUV data for display 52 in the main memory 18 after executing the image processings on the pixel signal input from the CCD 8. The display control unit 14 reads the YUV data for display 52 from the main memory 18 and outputs the data to the LCD 23. In this manner, until the image imaged by the CCD 8 is displayed on the LCD 23, writing and reading of the YUV data for display 52 into and from the main memory 18 are executed. The band of the main bus 25 is also used by these transfer processes.

The CPU 16 sequentially determines how much the bus band of the main bus 25 is used by monitoring the operation of the DMA controller 21. Alternatively, the CPU 16 determines the usage rate of the bus band of the main bus 25 from the execution state of itself. Then, frame rate of the live view image to be displayed on the LCD 23 is controlled depending on the usage rate of the band of the main bus 25.

Figure 5:
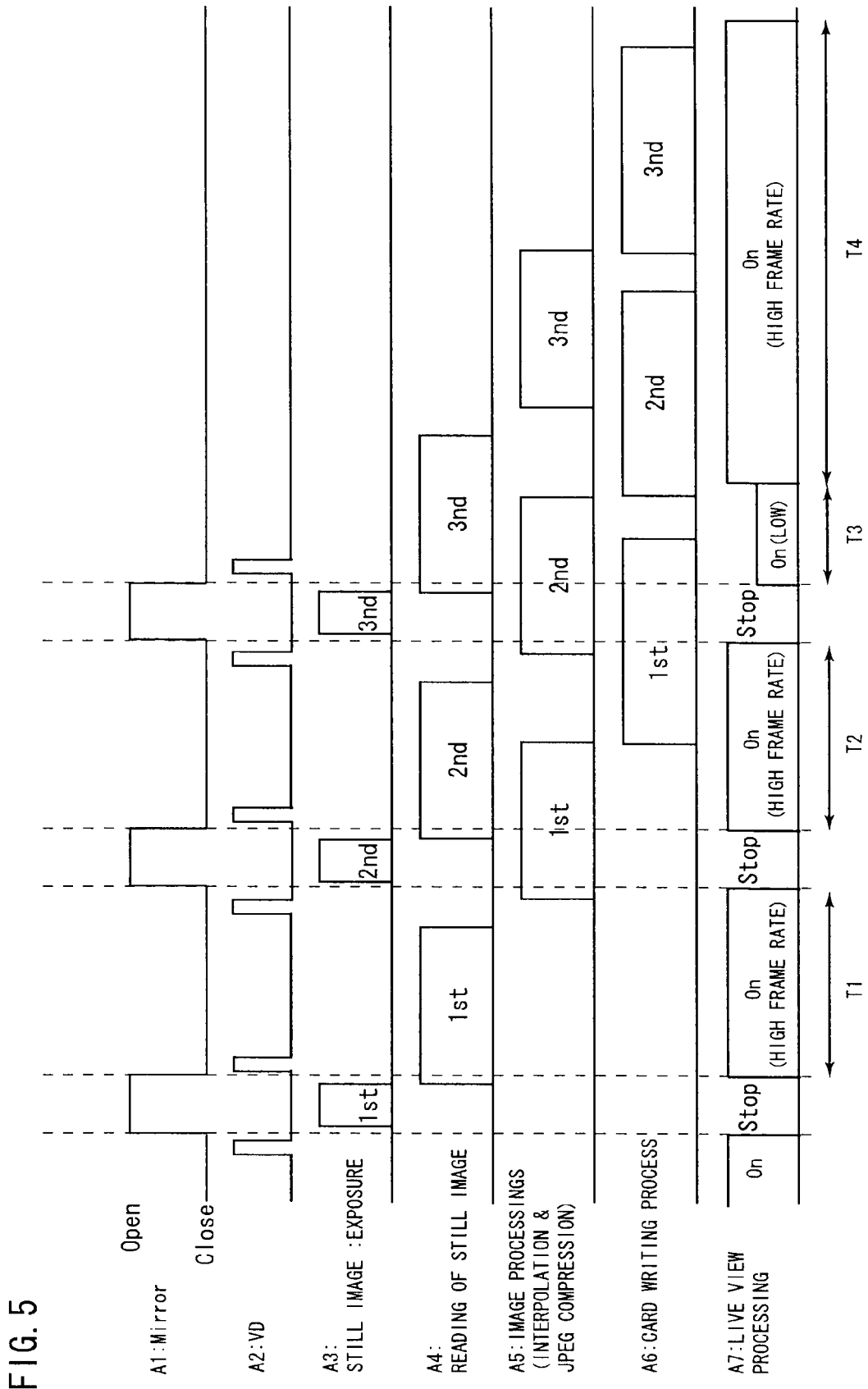
FIG. 5 is a sequence diagram showing image processings during continuous shooting in the single-lens reflex digital camera according to the embodiment.
Figure 6:
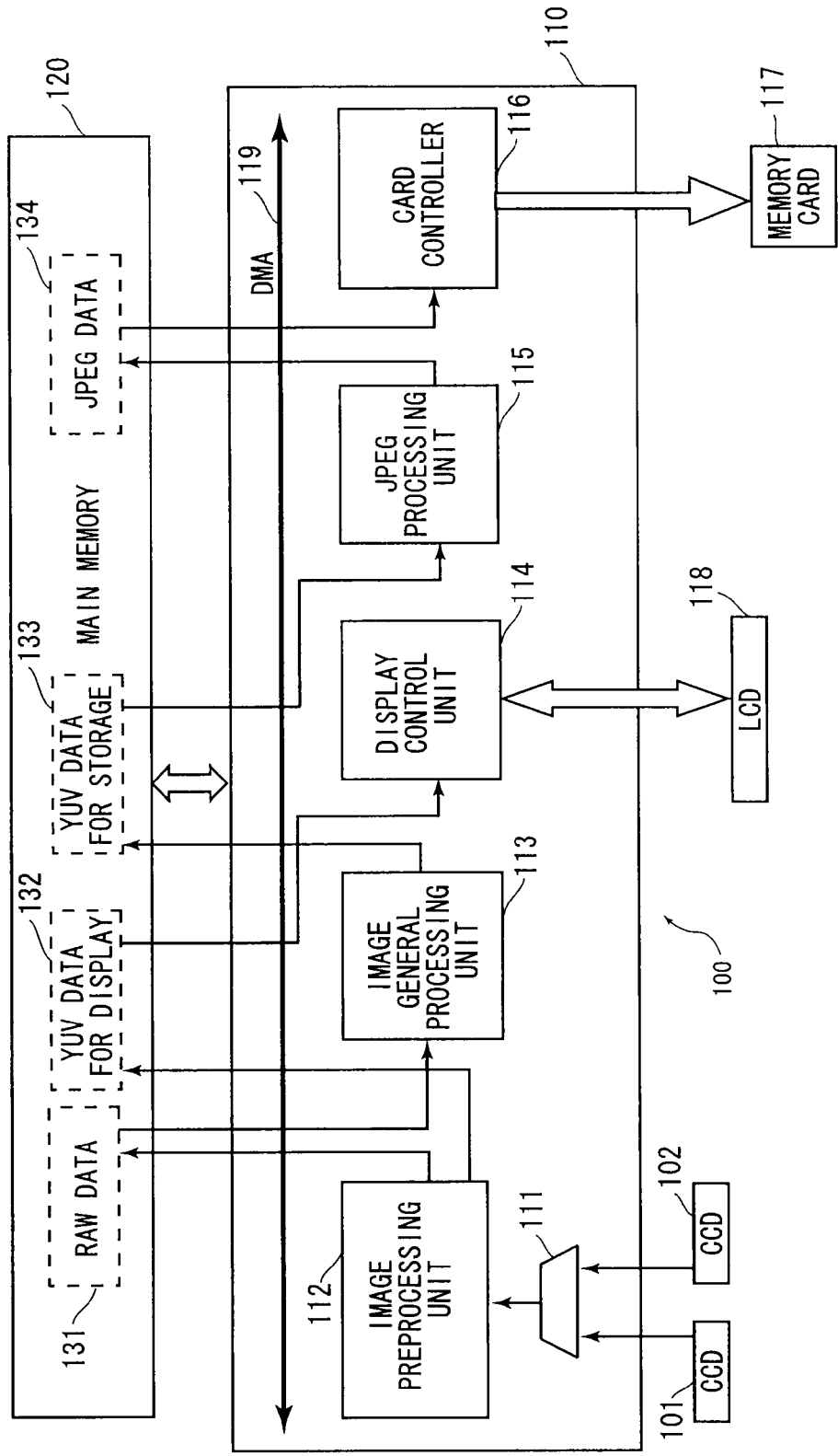
FIG. 6 is a diagram showing a flow of image processings and data stored in a main memory in a conventional single-lens reflex digital camera.
Figure 7:
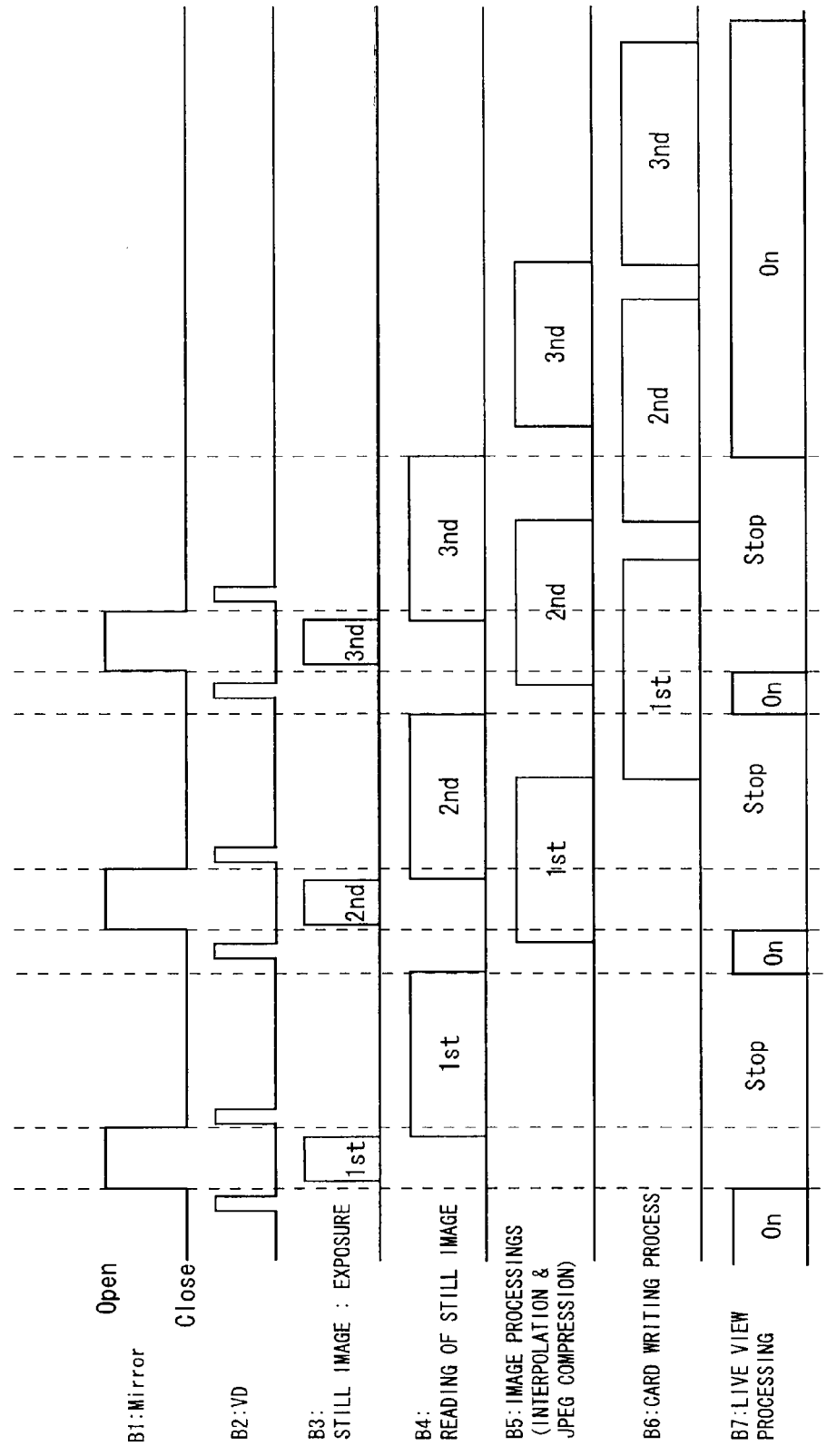
FIG. 7 is a sequence diagram showing image processings during continuous shooting in the conventional single-lens reflex digital camera.

FIG. 5 is a diagram showing a process sequence when the single-lens reflex digital camera 1 executes continuous shooting. A signal A1 represents a signal controlling opening and closing operations of the movable mirror 3. "Open" in FIG. 5 indicates a state where the movable mirror 3 is raised up, that is to say, a timing at which the light from the subject is incident on the CCD 6. "Close" in FIG. 5 indicates a state where the movable mirror 3 is closed, that is to say, a period during which the light from the subject is incident on the CCD 8. A signal A2 represents a vertical synchronizing signal (VD) of the CCD 6.

A timing flow A3 represents a timing at which a still image (image for storage) is imaged by exposure of the CCD6. A timing flow A4 represents a timing at which the image preprocessing unit 11 reads the pixel signal from the CCD 6 and a timing at which image processings are executed in the image preprocessing unit 11. A timing flow A5 represents a timing at which the image general processing unit 12 executes the image processings on the RAW image data 51 and a timing at which the JPEG processing unit 15 executes JPEG compression process on the YUV data for storage 53. A timing flow A6 represents a timing at which the card controller 19 stores the JPEG data 54 in the memory card 20. Then, a timing flow A7 represents a timing at which the image for live view output from the CCD 8 is displayed on the LCD 23. In the timing flow A7, "On" indicates a timing at which live view is displayed and "Stop" indicates a timing at which live view display is stopped.

It is to be noted that "1st", "2nd", and "3rd" in FIG. 5 indicate processes for first, second, and third still images, respectively, during continuous operation.

Live view is displayed before first "Open" operation of the movable mirror 3 as shown in FIG. 5. Along with the first "Open" operation of the movable mirror 3, the first still image is imaged by exposure of the CCD6. During this period, live view display is stopped because the light from the subject is not incident on the CCD 8.

Then, along with first "Close" operation of the movable mirror 3, the image preprocessing unit 11 reads the first still image from the CCD 6 and image processings are started in the image preprocessing unit 11. During this period (period T1 in FIG. 5), the pixel signal output from the CCD 8 is image-processed in the live image processing unit 13, and the YUV data for display 52 is stored in the main memory 18. Further, the YUV data for display 52 stored in the main memory 18 is read in the display control unit 14 and output to the LCD 23. Therefore, live view is also displayed even while the image preprocessing unit 11 reads the first still image.

In the period T1, writing of the RAW image data 51 by the image preprocessing unit 11 into the main memory 18, writing of the YUV data for display 52 by the live image processing unit 13 into the main memory 18, and reading of the YUV data for display 52 by the display control unit 14 are executed. However, the usage rate of the band of the main bus 25 is relatively low in the period T1 since second and subsequent imaged image data are not transferred. So the CPU 16 sets the frame rate of the live view display on the LCD 23 to be "high". Live view is, therefore, displayed on the LCD 23 at high frame rate in the period T1.

Then, when second "Open" operation of the movable mirror 3 is started, live view display is stopped because the light from the subject is not incident on the CCD 8. Along with the second "Open" operation of the movable mirror 3, the second still image is imaged by exposure of the CCD6

Then, along with second "Close" operation of the movable mirror 3, the image preprocessing unit 11 reads the second still image from the CCD 6 and image processings are started in the image preprocessing unit 11. During this period (period T2 in FIG. 5), the pixel signal output from the CCD 8 is image-processed in the live image processing unit 13, and the YUV data for display 52 is stored in the main memory 18. Further, the YUV data for display 52 stored in the main memory 18 is read in the display control unit 14 and output to the LCD 23. Therefore, live view is also displayed even while the image preprocessing unit 11 reads the second still image.

In the period T2, the usage rate of the band of the main bus 25 is higher than that in the period T1 because reading of the first RAW image data 51 by the image general processing unit 12, writing of the first YUV data for storage 53 by the image general processing unit 12, reading of the first YUV data for storage 53 by the JPEG processing unit 15, and writing of the first JPEG data 54 are added.

However, the CPU 16 sets the frame rate of the live view display on the LCD 23 to be "high" since a third imaged image is not still started to be transferred. Live view is, therefore, displayed on the LCD 23 at high frame rate in the period T2.

Subsequently, when third "Open" operation of the movable mirror 3 is started, live view display is stopped because the light from the subject is not incident on the CCD 8. Along with the third "Open" operation, the third still image is imaged by exposure of the CCD6.

Then, along with third "Close" operation of the movable mirror 3, the image preprocessing unit 11 reads the third still image from the CCD 6 and image processings are started in the image preprocessing unit 11. During this period (period T3 in FIG. 5), the pixel signal output from the CCD 8 is image-processed in the live image processing unit 13, and the YUV data for display 52 is stored in the main memory 18. Further, the YUV data for display 52 stored in the main memory 18 is read in the display control unit 14 and output to the LCD 23. Therefore, live view is also displayed even while the image preprocessing unit 11 reads the third still image.

In the period T3, the usage rate of the band of the main bus 25 is higher than those in the periods T1 and T2. In the period T3, along with writing process of the first still image into the memory card 20, the reading process of the first JPEG data 54 by the card controller 19 is executed. Further, along with image processings of the second still image, reading of the RAW image data 51 and writing of the YUV data for storage 53 by the image general processing unit 12 are executed. Along with the compression process of the second still image, reading of the YUV data for storage 53 and writing of the JPEG data 54 by the JPEG processing unit 15 are executed. Moreover, along with reading process of the third still image, writing process of the third RAW image data 51 is executed. So the CPU 16 sets the frame rate of the live view display on the LCD 23 to be "low". Live view is, therefore, displayed on the LCD 23 at low frame rate in the period T3.

In the subsequent period T4, the usage rate of the band of the main bus 25 becomes lower than that in the period T3. The CPU 16 sets the frame rate of the live view display on the LCD 23 to be "high" in the period T4. Live view is, therefore, displayed on the LCD 23 at high frame rate.

As described above, according to the single-lens reflex digital camera 1 of the embodiment, the live view can be continuously displayed at timings other than the timing at which the movable mirror 3 is raised up and the light from the subject is not incident on the CCD 8.

The CPU 16 outputs control signals FC for setting frame rate of live view display to the live image processing unit 13 and the display control unit 14. The control signals FC are signals which specify the live view display to be high frame rate or low frame rate. The live image processing unit 13 determines the frame rate of the YUV data for display 52 to be output based on the control signal FC. In this embodiment, when the frame rate is specified to be high, the live image processing unit 13 outputs the YUV data for display 52 with the frame rate of the image output from the CCD 8 maintained. On the other hand, when the frame rate is specified to be low, the live image processing unit 13 outputs the YUV data for display 52 with the frame rate of the image output from the CCD 8 reduced.

The display control unit 14 reads the YUV data for display 52 stored in the main memory 18 based on the frame rate specified by the control signal FC and outputs the data to the LCD 23.

Thus, even when processings on the still image and the display image are concurrently executed during continuous shooting, the band of the main bus 25 is not squeezed since the frame rate of live view display is controlled based on the usage rate of the band of the main bus 25. Therefore, live view can be displayed without delaying the storing process of the still image.

Another embodiments in which the frame rate of live view display is modified will be described. One of the embodiments is a method of controlling the output frame rate of the CCD 8. When the CPU 16 specifies the frame rate of live view display to be high, the CCD 8 outputs the pixel signal at normal frame rate. When the CPU 16 specifies the frame rate to be low, the CCD 8 outputs the pixel signal at lower frame rate than the normal frame rate.

Another method is a method of controlling the reading timing of the YUV data for display 52 by the display control unit 14. When the CPU 16 specifies the frame rate of live view display to be high, the display control unit 14 reads the YUV data for display 52 which is written into the main memory 18 with the frame rate thereof maintained and outputs the data to the LCD 23. When the CPU 16 specifies the frame rate of live view display to be low, the display control unit 14 reads the YUV data for display 52 which is written into the main memory 18 at the flame rate lower than the writing rate and outputs the data to the LCD 23.

In such a manner, according to the single-lens reflex digital camera 1 of the embodiment, the live view can be displayed for a long period of time even in continuous shooting. That is to say, each of the two image processing units (the image preprocessing unit 11 and the live image processing unit 13) which processes pixel signals output from the CCD 6 and the CCD 8 individually operate so that live view display can be started at an early timing with no need of waiting completion of the reading process of the still image. In particular, operability is improved by making the display period of live view during continuous shooting longer.

In the above embodiment, the CPU 16 adjusts the frame rate at two stages of "high" and "low", but may adjust the frame rate at three or more stages. For example, the period T1, the period T2, and the period T3 in FIG. 5 may be adjusted to be "high", "medium" and "low", respectively.

In the above embodiment, the CPU 16 determines the usage rate of the band of the main bus 25 from the operation state of the CPU itself or by monitoring the operation of the DMA controller 21. In an embodiment other than that, exclusive hardware which determines the usage rate of the band of the main bus 25 may be provided.

While the invention has been shown and described in detail, the foregoing description is in all aspects illustrative and not restrictive. It is therefore understood that numerous modifications and variations can be devised without departing from the scope of the invention.

What is claimed is:

1. A single-lens reflex digital camera which displays an image for live view on a display device, comprising:
a first imaging element for imaging an image for storage;
a second imaging element for imaging an image for live view;
a memory;
a first image processing unit which executes image processings on a pixel signal output from the first imaging element to generate image data for storage and store the generated image data for storage in the memory;
a second image processing unit which executes image processings on a pixel signal output from the second imaging element to generate image data for live view and store the generated image data for live view in the memory;
an image compressing unit which compresses the image data for storage stored in the memory and generates compressed image data;
a display control unit which outputs the image data for live view stored in the memory to the display device;
a rate specifying unit which specifies a frame rate of the image for live view based on a usage rate of a bus to which the memory is connected;
a rate adjusting unit which adjusts the frame of the image for live view displayed on the display device while maintaining a transfer rate of the image data for storage transferred over the bus, on a basis of the frame rate specified by the rate specifying unit;
an optical member through which light from a subject is incident; and
a movable mirror which guides the light from the subject incident through the optical member selectively to either of the first imaging element or the second imaging element, wherein
the first imaging element is exposed to the light from the subject in a state where the movable mirror is raised up along with recording operation of the image for storage, and the image data for storage is written into the memory by the first image processing unit with at least part of the image data for live view stored in the memory by operating the second imaging element and the second image processing unit concurrently with image processings in the first image processing unit in a state where the movable mirror is closed, and
the image data for live view is read out of the memory and output to the display device in a state where the movable mirror is closed.

2. The single-lens reflex digital camera according to claim 1, wherein
the second image processing unit includes a pixel interpolation processing unit.

3. The single-lens reflex digital camera according to claim 1, wherein
the second image processing unit includes a gamma conversion processing unit.

4. The single-lens reflex digital camera according to claim 1, wherein
the second image processing unit includes a color space conversion processing unit.

5. The single-lens reflex digital camera according to claim 1, wherein the rate adjusting unit adjusts the frame rate of the image data for live view which is written into the memory depending on the usage rate of the band of the bus.

6. The single-lens reflex digital camera according to claim 1, wherein
the rate adjusting unit adjusts output rate of the second imaging element depending on the usage rate of the band of the bus.

7. The single-lens reflex digital camera according to claim 1, wherein the rate adjusting unit adjusts reading rate of the image data for live view from the memory by the display control unit depending on the usage rate of the band of the bus.

8. The single-lens reflex digital camera according to claim 1, wherein live view images are continuously displayed at all timings other than times in which the movable mirror is raised up and light from the subject is not incident on the second imaging element.

9. The single-lens reflex digital camera according to claim 1, wherein when the usage rate of the bus is high, the frame rate for live view is adjusted to a lower frame rate.

10. The single-lens reflex digital camera according to claim 1, further comprising:
a processor,
wherein the usage rate of the band of the bus is determined based on an operational state of the processor, and
wherein the processor outputs control signals for indicating the frame rate of the image for live view specified by the rate specifying unit to the display control unit.

11. The single-lens reflex digital camera according to claim 10, wherein the processor is a DMA controller.

12. The single-lens reflex digital camera according to claim 10, wherein the processor is a CPU.

* * * * *